(No Model.)
D. RUDOMIN.
BICYCLE SUPPORT.
No. 587,236. Patented July 27, 1897.
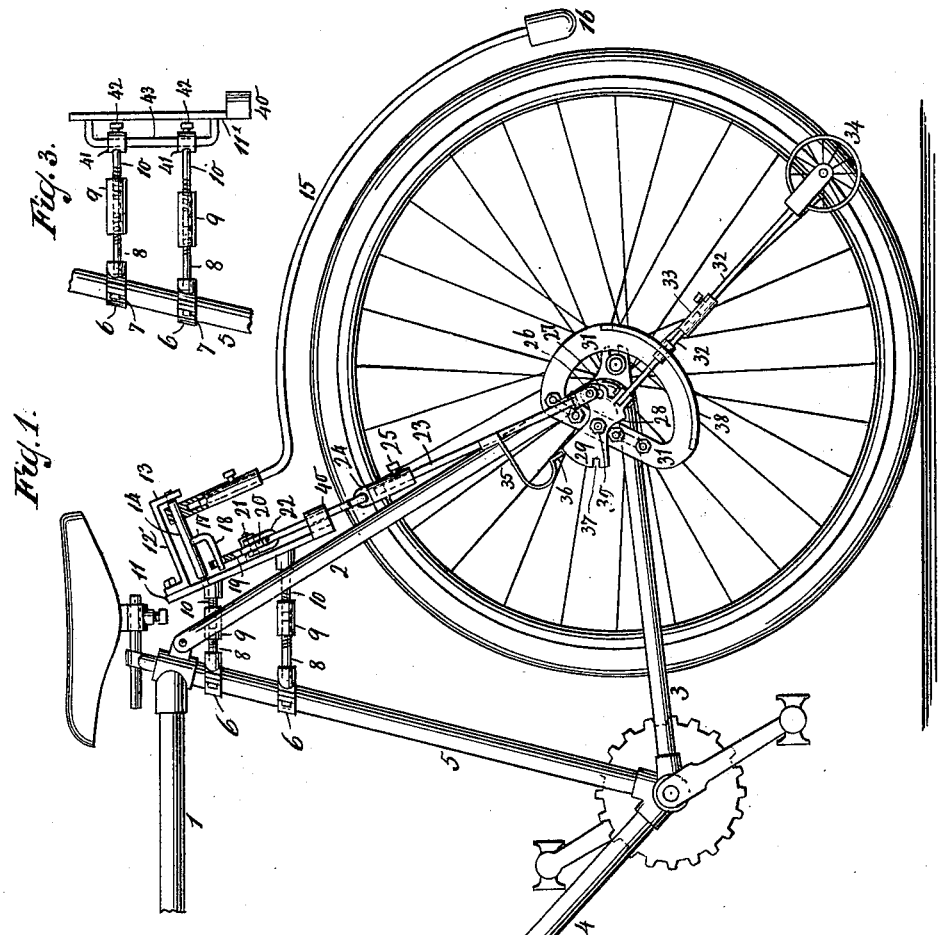
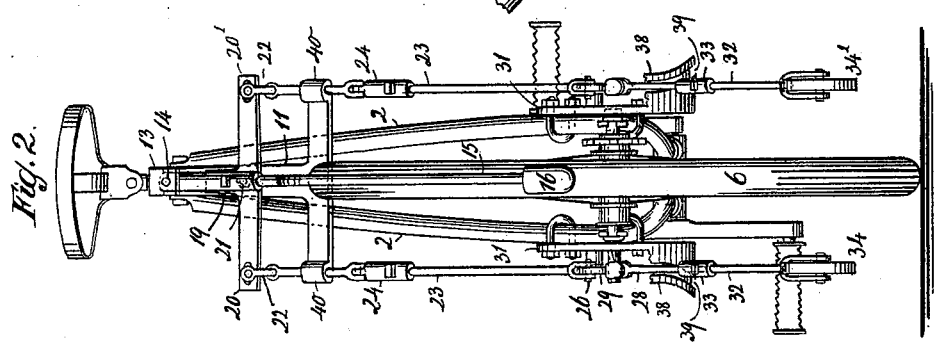
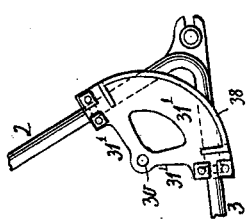
WITNESSES:
E. Wolff
Chas. E. Poensgen.
INVENTOR:
David Rudomin.
BY Hauff & Hauff
ATTORNEYS.

UNITED STATES PATENT OFFICE.

DAVID RUDOMIN, OF NEW YORK, N. Y.

BICYCLE-SUPPORT.

SPECIFICATION forming part of Letters Patent No. 587,236, dated July 27, 1897.

Application filed November 14, 1896. Serial No. 612,124. (No model.)

*To all whom it may concern:*

Be it known that I, DAVID RUDOMIN, a subject of the Emperor of Russia, residing at New York, in the county and State of New York, have invented new and useful Improvements in Bicycle-Supports, of which the following is a specification.

This invention relates to a bicycle-support made to act or adjust itself automatically; and the invention resides in the novel features of construction set forth in the following specification and claims and illustrated in the annexed drawings, in which—

Figure 1 is a side elevation of a support. Fig. 2 is a rear elevation of Fig. 1. Fig. 3 is a side elevation of a modification. Fig. 4 is a side elevation of another modification.

A portion of a bicycle or velocipede frame is indicated at 1 2 3 4 5 and a velocipede-wheel at 6. Secured to frame part 5 by collars and screws 6 and 7, Fig. 3, are rod-sections 8, connected by oppositely-threaded screw-collars 9 to rod-sections 10. The sections 8 and 10 being oppositely threaded for engagement by collars 9, a rotation of the collars will lengthen or shorten the rods or carriers 8 10, or, in other words, the collars 9 serve for adjustment. The rods 8 10 carry or support the base part 11, Fig. 1, of a bearing 11 12 13, supporting a rock-shaft 14, to which is secured an arm 15, weighted at 16. To rock-shaft 14 is secured an arm 17 18, the part 18 of which engages an arm 19 of a three-armed lever 19 20 20', fulcrumed at 21. The parts 16 15 14 17 18 practically form a lever for actuating lever 19 20 20'.

The arms 20 and 20' each connect with links 22, connecting with rods 23. The rods 23 can be made adjustable or capable of being lengthened or shortened by being formed of sections connected by collar and screw 24 and 25, as seen in Fig. 1. The rods 23 each connect by pin-and-slot connection 26 and 27 with a lever 28 and 29, fulcrumed at 30. This fulcrum or pivot 30 is carried by a plate or support 31, suitably secured to frame parts 2 and 3, as by screw-collars or other fastenings or clamps. To each lever-arm 28 is secured a support or leg 32, which can be lengthened or shortened or made adjustable, as by a screw or clamping collar 33, Fig. 1. Each leg 32 carries a wheel 34 and 34', located, respectively, on opposite sides of the bicycle, as seen in Fig. 2.

In case the bicycle should tilt—as, for example, to the left, looking at Fig. 2—the weight 16 tending to maintain the arm 15 in plumb may be considered relatively to the bicycle as swinging to the left or the lower side of the inclined bicycle. This relative motion or swing of the arm 15 causes a rocking of shaft 14 and of arm 17 18, causing the lever-arm 19 to be rocked or inclined toward the lower side, or, in the case supposed, the left side of the bicycle looking at Fig. 2, and causing the lever-arm 20 to relatively dip or depress link 23 and lever-arm 28 to bring the leg 32, carrying wheel 34, to come to the ground or to prevent the bicycle tilting to the left beyond a certain inclination. If the bicycle should tilt the opposite way or to the right, looking at Fig. 2, the lever-arm 20' would dip to bring the wheel 34' to the ground.

The links 23 each carry a spring 35, Fig. 1, provided with a finger or detent 36. Each lever arm or segment 29 has a depression 37. When a link 23 moves to carry a wheel 34 or 34' to standing position, said link carries or presses the detent 35 36 against its corresponding segment 29, and when the leg 32 is in standing position the detent snaps into depression 37 to hold such leg in action. When the bicycle is righted or tilted in the opposite direction, the link 32 rises, and by reason of the pin-and-slot connection 26 and 27 has enough play or independent motion to withdraw detent 36 from depression 37, and thus free the lever 29 28 and leg 32, so that the latter can be swung up from the ground.

Each plate 31 has a flange 38, through the guiding-slot 39 of which extends a leg 32, said slot toward its lower position branching or slanting outward to give the leg 32 an outward swing as it approaches the ground. When out of action, each leg 32 can thus be made to lie close to the bicycle, but on coming to active position said leg 32 swings its wheel 34 or 34' outward or away from the bicycle to secure the latter against falling over. Each leg 32 can be jointed to its lever arm or segment 28, so as to be capable of swinging laterally, but to move up and down with such segment.

The bearing part 11 is shown with eyes or guiding portions 40 for the links 23. This bearing part 11 can be fixedly secured to the supports 10, as in Fig. 1, or adjustably connected, as in Fig. 3, where the bearing part 11' is adjustably connected to the supports 10 by eyes and screws 41 and 42, engaging a loop 43. The plate 31 can be adjusted as in Fig. 1 or in a different position—as shown, for example, by the plate 31' in Fig. 4.

The legs 32 can be used to support a bicycle when standing or to prevent a bicycle in motion falling to either side, the wheels 34 and 34' allowing the bicycle to travel even when being supported. The support is convenient, being out of the way of the rider and is, moreover, readily removable and replaceable and adaptable to all kinds of bicycles. Being automatic the support aids beginners in learning. The arm 15 can be adjustably connected to rock-shaft 14.

What I claim as new, and desire to secure by Letters Patent, is—

1. A bicycle provided at each side with a movable support, and mechanism arranged in operative connection with both supports and automatically operated by tilting the bicycle to move either support downward against the ground, substantially as described.

2. A bicycle provided with oppositely-located movable supports and a weighted lever for bringing the support at the lower side of the bicycle into action substantially as described.

3. A bicycle provided with oppositely-located movable supports, a weighted lever for bringing the support at the lower side of the bicycle into action, and a three-armed connecting-lever linked or connected to the supports and to the weighted lever substantially as described.

4. A bicycle provided with oppositely-located movable supports, a weighted lever, a three-armed lever connected to the weighted lever, and links for connecting the three-armed lever and the supports, said supports and links being loosely connected to allow the links motion independently of the supports, said links having a detent-spring and said supports having a notched arm or segment adapted to be engaged by the spring to lock the lowered or active support substantially as described.

5. A bicycle provided with oppositely-located movable supports, a weighted lever for alternately bringing the supports to active position, and guides for throwing the supports outward when moving to such position substantially as described.

In testimony whereof I have hereunto set my hand in the presence of two subscribing witnesses.

D. RUDOMIN.

Witnesses:
WM. C. HAUFF,
E. F. KASTENHUBER.